(12) United States Patent
Shimano et al.

(10) Patent No.: US 7,457,206 B2
(45) Date of Patent: Nov. 25, 2008

(54) OPTICAL HEAD, OPTICAL INFORMATION STORAGE APPARATUS, AND THEIR FABRICATION METHOD

(75) Inventors: Takeshi Shimano, Yokohama (JP); Masatoshi Kanamaru, Miho (JP); Masaya Horino, Yasato (JP)

(73) Assignee: Hitachi, Ltd., Tokyo (JP)

( * ) Notice: Subject to any disclaimer, the term of this patent is extended or adjusted under 35 U.S.C. 154(b) by 700 days.

(21) Appl. No.: 11/211,438

(22) Filed: Aug. 26, 2005

(65) Prior Publication Data
US 2006/0193214 A1 Aug. 31, 2006

(30) Foreign Application Priority Data
Feb. 28, 2005 (JP) ............................. 2005-052252

(51) Int. Cl.
*G11B 7/00* (2006.01)
(52) U.S. Cl. ................................... 369/44.12
(58) Field of Classification Search ............. 369/44.11, 369/44.12, 44.14, 44.15, 112.01, 44.23, 44.24
See application file for complete search history.

(56) References Cited
U.S. PATENT DOCUMENTS
5,481,386 A 1/1996 Shimano et al.
7,283,448 B2 * 10/2007 Sohn et al. ............. 369/112.01

FOREIGN PATENT DOCUMENTS
| JP | 6-251410 | 9/1994 |
| JP | 11-144297 | 5/1999 |
| JP | 2004-103241 | 4/2004 |
| JP | 2004-272951 | 9/2004 |

* cited by examiner

*Primary Examiner*—Nabil Z Hindi
(74) *Attorney, Agent, or Firm*—Antonelli, Terry, Stout & Kraus, LLP.

(57) ABSTRACT

In an optical head, if a lens is reduced in size so that it can be integrated with a light source and a photodetector, other optical components as well as the lens must be reduced in size, which would result in greater difficulties in handling for assembly and adjustment purposes. The invention allows large quantities of ultra-small optical heads to be produced accurately and at low cost, the optical heads being easy to adjust and not requiring the handling of minute components for adjustment purposes. A first substrate includes lenses for focusing light on an information storage medium, a second substrate includes detectors and disposed on the surface thereof, and a layer, which is disposed between the first and second substrates, includes prisms and mirrors. The layer also includes cavities in which light sources are disposed. The individual substrates are formed in the form of wafers with the lenses, mirrors, prisms, light sources, and photodetectors disposed thereon.

10 Claims, 16 Drawing Sheets

FIG. 10

| # | TYPE | RADIUS | DISTANCE | GLASS | INDEX | APE-Y | AP | ADE | YDE |
|---|------|--------|----------|-------|-------|-------|-----|-----|-----|
| OBJ | S | Infinity | 1 | | 1 | 0.3 | C | 0 | 0 |
| 1 | SDM | Infinity | -0.29827 | | -1 | 0.3 | C | -45 | 0 |
| 2 | A | 0.23047702 | -0.4 | M-LAF81 | -1.762497 | 0.15 | C | 0 | 0 |
| 3 | A | 0.36 | -0.05 | | -1 | 0.3 | C | 0 | 0 |
| STO | A | -0.2577937 | -0.3002 | M-LAF81 | -1.762497 | 0.25 | C | 0 | 0 |
| 5 | A | 0.85357006 | -0.08427 | AIR | -1 | 0.21 | C | 0 | 0 |
| 6 | S | Infinity | -0.1 | POLYCARB | -1.622307 | 0.3 | C | 0 | 0 |
| 7 | SDM | Infinity | 0.1 | POLYCARB | 1.622307 | 0.3 | C | 0 | 0 |
| 8 | S | Infinity | 0.08427 | AIR | 1 | 0.3 | C | 0 | 0 |
| 9 | A | 0.85357006 | 0.3002 | M-LAF81 | 1.762497 | 0.21 | C | 0 | 0 |
| 10 | A | -0.2577937 | 0.05 | | 1 | 0.25 | C | 0 | 0 |
| 11 | A | 0.36 | 0.4 | M-LAF81 | 1.762497 | 0.3 | C | 0 | 0 |
| 12 | A | 0.23047702 | 0.29827 | | 1 | 0.15 | C | 0 | 0 |
| 13 | SD | Infinity | 0.5 | M-LAF81 | 1.762497 | 0.5 | R | 45 | 0 |
| 14 | SDM | Infinity | -0.7 | M-LAF81 | -1.762497 | 0.7 | R | 0 | 0.22 |
| 15 | SDM | Infinity | 0.7 | M-LAF81 | 1.762497 | 0.28 | R | 0 | 0.48 |
| 16 | SDM | Infinity | -0.7 | M-LAF81 | -1.762497 | 0.2 | R | 0 | 0.75 |
| 17 | SDM | Infinity | 0.7 | M-LAF81 | 1.762497 | 0.3 | R | 0 | 1.02 |
| 18 | SDM | Infinity | -0.7 | M-LAF81 | -1.762497 | 0.4 | R | 0 | 1.3 |
| 19 | SDM | Infinity | 0.7 | M-LAF81 | 1.762497 | 0.3 | R | 0 | 1.58 |
| 20 | SD | Infinity | 0 | M-LAF81 | 1.762497 | 0.2 | C | 0 | 1.85 |
| IMG | SD | Infinity | | M-LAF81 | 1.762497 | 0.2 | C | 0 | 1.85 |

FIG. 11

| # | Type | K | A | B | C | D |
|---|---|---|---|---|---|---|
| 2 | EVEN | 0 | −5.99977E+00 | 1.46801E+03 | −5.50651E+04 | 1.17611E+06 |
| 3 | EVEN | −0.1877329 | −5.65843E−01 | 2.11981E+01 | −2.00409E+02 | 9.16876E+02 |
| 4 | EVEN | −0.2856808 | 1.86474E+00 | 2.55111E+01 | −7.74111E−01 | 1.04140E−01 |
| 5 | EVEN | 0 | −1.13728E+01 | 2.04975E+00 | 7.79076E−02 | −1.71237E+00 |
| 9 | EVEN | 0 | −1.13728E+01 | 2.04975E+00 | 7.79076E−02 | −1.71237E+00 |
| 10 | EVEN | −0.2856808 | 1.86474E+00 | 2.55111E+01 | −7.74111E−01 | 1.04140E−01 |
| 11 | EVEN | −0.1877329 | −5.65843E−01 | 2.11981E+01 | −2.00409E+02 | 9.16876E+02 |
| 12 | EVEN | 0 | −5.99977E+00 | 1.46801E+03 | −5.50651E+04 | 1.17611E+06 |

FES=(A-B+C) – k (D-E+F+G-H+I)

TES=D+E+F-G-H-I

RFS=A+B+C+D+E+F+G+H+I

FES=(A-B+C) – k (D-E+F+G-H+I)

TES=D+E+F-G-H-I

RFS=J

OPTICAL HEAD, OPTICAL INFORMATION STORAGE APPARATUS, AND THEIR FABRICATION METHOD

CLAIM OF PRIORITY

The present application claims priority from Japanese application JP 2005-052252 filed on Feb. 28, 2005, the content of which is hereby incorporated by reference into this application.

BACKGROUND OF THE INVENTION

1. Field of the Invention

The present invention relates to an optical head for reproducing or recording information on optical information storage media, an apparatus for reproducing and/or recording optical information, and their manufacturing method.

2. Background Art

Optical disc units for CDs and DVDs are widely available examples of optical information reproducing apparatuses. In CDs, light with the wavelength of 780 nm is focused beyond a 1.2-mm thick substrate by an optical head with the numerical aperture (NA) of 0.45. In DVDs, the wavelength is reduced to 650 nm, and the NA is increased to 0.6 so as to achieve higher capacities than CDs. As a result, the thickness of the substrate of the DVD is set to be 0.6 mm in order to reduce the influence of coma aberration that is produced when the disc is inclined. In recent years, large-capacity optical discs referred to as Blu-ray Discs (BDs) have also been put on the market, in which a blue-violet laser diode is used. In BDs, the NA of the objective lens is increased to 0.85 for even greater capacities. At the same time, in order to reduce the influence of the tilting of the disc, the thickness of the substrate is reduced to 0.1 mm. In practice, however, a 0.1-mm thick substrate is unable to carry a 120-mm disc. Therefore, a 0.1-mm thick cover layer is provided on a 1.1-mm thick substrate, and light is focused beyond the cover layer.

An example of an optical head used in such disc systems is disclosed in Patent Document 1 (JP Patent Publication (Kokai) No. 11-144297 A (1999). In this example, a semiconductor laser chip is integrally formed with a prism, a photodetector, and a substrate, and one such unit is stacked on top of the other in two stages so as to handle the two kinds of optical discs, namely CDs and DVDs, for example. Light emitted from such a module is focused on a disc by an objective lens separately mounted on an actuator. The light is then reflected back to the same module, where it is reflected in the prism and then received by the photodetector.

Another conventional example of an optical head is disclosed in Patent Document-2 (JP Patent Publication (Kokai) No. 2004-103241 A), in which a semiconductor laser, a prism, and a photodetector are also combined into a module. Light emitted by the module is also focused by an externally disposed objective lens onto an optical disc and then returned back to the module. This example differs from that of Patent Document 1 in that a diffraction grating is added to the module, whereby the reflected light from the optical disc is guided to the photodetector.

In yet another example of an optical head, Patent Document 3 (JP Patent Publication (Kokai) No. 2004-272951 A) discloses a module consisting of a semiconductor laser and a photodetector. The module is further integrated with an objective lens as well as a diffraction grating, which is disposed in an upright manner inside the module such that it can act on the light from the semiconductor laser before it is reflected by a mirror. In an optical disc unit based on this technology, the optical head is mounted on a swing-arm actuator so that the entire optical head can be actuated for reproducing a signal from the optical disc.

Patent Document 4 (JP Patent Publication (Kokai) No. 6-251410 A (1994), corresponding to U.S. Pat. No. 5,481,386) discloses yet another example of an optical head in which a surface-emission laser, a photodetector, a diffraction lens, and a diffraction grating are integrally fabricated in a module. The light emitted from the surface-emission laser is focused on an optical disc by a diffractive lens, and the reflected light is guided to the photodetector by the diffraction grating. In an optical disc unit based on this technology, the optical head is disposed on a swing arm so that the entire optical head can be actuated for positioning a light spot on a particular information track.

Patent Document 1: JP Patent Publication (Kokai) No. 11-144297 A (1999)

Patent Document 2: JP Patent Publication (Kokai) No. 2004-103241 A

Patent Document 3: JP Patent Publication (Kokai) No. 2004-272951 A

Patent Document 4: JP Patent Publication (Kokai) No. 6-251410 A (1994)

SUMMARY OF THE INVENTION

As the capacity of optical discs increases, a transparent substrate or a cover layer with which a recording film on the optical disc is covered is gradually becoming thinner. As a result, not only has the size of the optical spot on the recording film become smaller, but also the size of the optical spot on the surface of the substrate or the cover layer has become smaller. Specifically, when the refraction index of the substrate is approximately 1.6 regardless of the wavelength, the size of the optical spot on the surface of the substrate or cover layer is $0.45/1.6 \times 1.2 \times 2 = 0.68$ mm for CDs; $0.6/1.6 \times 0.6 \times 2 = 0.45$ mm for DVDs; and $0.85/1.6 \times 0.1 \times 2 = 0.11$ mm for BDs. The beam size at a position spaced apart from the surface of the substrate or cover layer by approximately 0.1 mm is $0.68 + 0.45 \times 0.1 \times 2 = 0.77$ mm for CDs; $0.45 + 0.6 \times 0.1 \times 2 = 0.57$ mm for DVDs; and $0.11 + 0.85 \times 0.1 \times 2 = 0.28$ mm for BDs. Thus, as the thickness of the substrate or cover layer decreases, the beam size can be further reduced, whereby it becomes possible in principle to reduce the size of lenses to such an extent that they can be integrated with a light source and a photodetector. However, as the lens becomes smaller in size, other optical components must also be reduced in size, which would make it very difficult to handle such components for assembly or adjustment purposes.

In Patent Document 1, although the semiconductor laser, photodetector, and prism are combined, the objective lens is not, which is not quite advantageous in terms of minimization of the optical system. Further, the prism must be individually affixed, resulting in a difficulty in handling and an increased time for adjustment, thereby making it difficult to achieve reduction in manufacturing cost.

In Patent Document 2, the objective lens is not integrated, as in Patent Document 1, and therefore this prior art is not suitable for the minimization of the optical system as a whole. Further, with regard to the prism, complex laminated prisms must be individually adjusted and affixed to a semiconductor laser/photodetector module, resulting in an increased adjustment time and manufacturing cost.

In Patent Document 3, although the objective lens is integrated, the number of components is large and adjustment is difficult, such that reduction of manufacturing cost is difficult to achieve. Particularly, it is difficult to secure sufficient positioning accuracy for the diffraction grating because it is disposed in an upright manner in the optical system.

In Patent Document 4, the objective lens is integrated and the entire manufacturing process can be performed through a semiconductor process. However, if the full-width at half maximum of emission angle is narrow, the magnification of the optical system that is required for obtaining a sufficiently small focused spot must be increased, which would result in an increase in the thickness between the laser and the objective lens. For example, when the full-width at half value of the emission angle of laser is 10°, the effective pupil diameter of the objective lens is 0.5 mm, and the ratio of the intensity of light beam at the outer-most edge of the effective light flux through the objective lens to the intensity of the light beam at the center of the optical axis (RIM intensity) is 0.2, the distance between the laser and the lens that is required would be approximately 1.9 mm. When the thickness for laser and that of the lens are further added, the total required thickness could exceed 3 mm.

In view of these problems of the prior art, it is an object of the invention to allow the objective lens to be integrated so that a thin and ultra-small sized optical head that is easy to assemble and adjust can be provided.

In order to overcome the aforementioned problems, in accordance with the invention, microlenses are fabricated on a transparent wafer in an array. Cavities each with an inclined plane providing a prism and a reflecting mirror are fabricated on another transparent substrate in an array. And photodetectors are fabricated on a semiconductor substrate, such as that of silicon, in an array. Light sources are also affixed to the semiconductor substrate. The prism/mirror substrate, the lens substrate, and the semiconductor substrate are then joined together and the joined substrates are thereafter cut so as to produce optical heads. The light source comprises a semiconductor laser of the Fabry-Perot type, which is currently easily convertible for higher outputs. The emitted light is directed vertically upwards using a mirror before it is focused on the disc. Reflected light is incident on the mirror surface via the lens, transmitted and refracted by the mirror surface, reflected by the bottom and top surfaces of the prism substrate, and then guided to the photodetector.

For size reduction purposes, the effective light flux diameter of the objective lens is set to be not more than 0.5 mm, and the thickness of a cover layer of the optical information storage medium is set to be not more than 0.1 mm. In this way, the thickness of the integrated optical head can be reduced to be 2 mm or smaller. In the recent laptop computers, a slot capable of accommodating a name-card sized card called a PC card with a thickness of approximately 5 mm is mounted as a virtually standard component. If an optical head with a thickness of 2 mm or smaller can be realized, it would be possible to achieve a thickness of a notebook computer of 5 mm or smaller, providing for 0.6 mm for the thickness of the medium, 0.2 mm for the thickness of the casing, both at the top and bottom, 1 mm for the thickness of the circuit substrate or the like, 0.4 mm for the spacing between the head and the disc in consideration of the disc plane fluctuations, and 0.8 mm for the thickness of the substrate for the stator of the spindle motor in addition to the thickness of the optical head.

For ease of assembly and better dissipation of heat from the laser, the cavities in the prism/mirror substrate are provided by throughholes, and the semiconductor lasers are mounted on the semiconductor substrate before the prism/mirror substrate and the lens substrate are joined together.

Because the semiconductor substrate, prism/mirror substrate, and lens substrate are cut only after they have been joined together, each of the sides of the individual substrates or the optical heads is placed in the same plane.

The lenses are fabricated by joining a collimator lens and an objective lens for achieving higher NA.

The refracted ray transmitted through the prism has an extended optical path if the magnification of the optical system is to be ensured. Therefore, the refracted ray is caused to enter the detector after being reflected by the bottom and top surfaces of the prism/mirror substrate once or more.

The thus produced optical head is disposed on an actuator, which is driven as a whole so as to position the head on a particular information track on the optical information storage medium.

The thus produced optical head comprises a first substrate with a lens for focusing light on an information storage medium, a second substrate with a detector disposed on the surface thereof, and a layer disposed between the first and second substrates and having a prism and a mirror. The layer also includes a cavity in which a light source is disposed. The light emitted by the light source is reflected by the mirror, passes through the lens, and is then focused on an external information storage medium. Reflected light from the information storage medium then passes through the lens and the prism and is then detected by the detector. Preferably, the light is reflected by the bottom and top surfaces of the prism/mirror substrate once or more before it is incident on the detector.

Because the optical head of the invention is manufactured with the lenses, mirrors, prisms, light sources, and photodetectors already disposed on the wafers, and adjustments are made with reference to alignment marks or the like, ultra-small optical heads can be manufactured accurately in large quantities at low cost without requiring the handling of small components for adjustment purposes.

By causing the light beam to be incident on the detector after being reflected by the bottom and top surfaces of the prism/mirror substrate once or more, the magnification of the optical system can be increased while the thickness of the prism/mirror substrate is reduced.

BRIEF DESCRIPTION OF THE DRAWINGS

FIG. 10 shows a table of optical constants for the embodiment shown in FIG. 8.

FIG. 11 shows a table of aspheric coefficients for the aspherical planes shown in FIG. 10.

DESCRIPTION OF THE PREFERRED EMBODIMENTS OF THE INVENTION

Preferred embodiments of the invention will be hereafter described with reference to the attached drawings.

Embodiment 1

Figure 1:
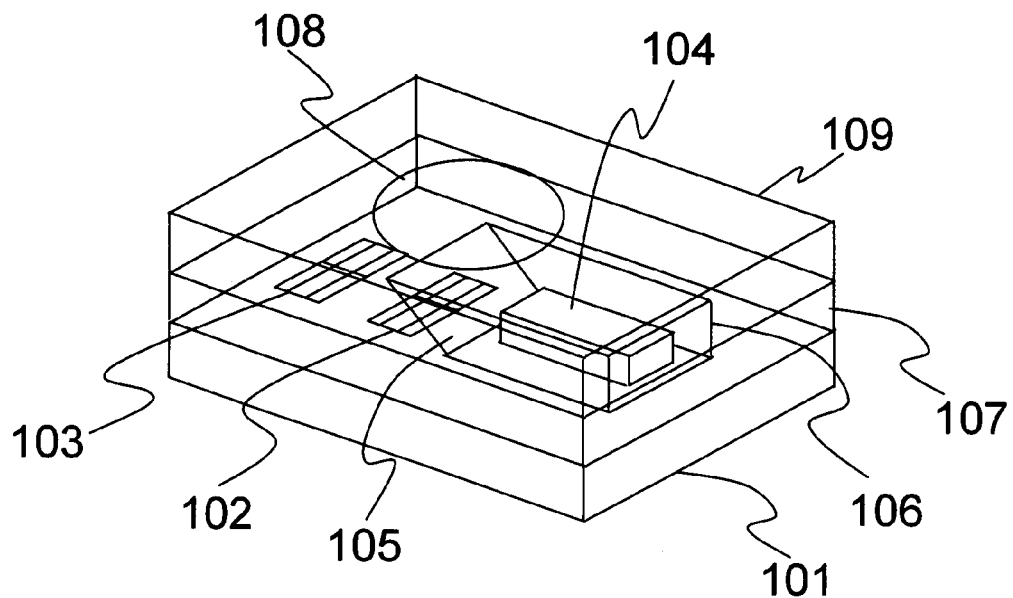
FIG. 1 shows the basic configuration of an optical head according to the invention.

FIG. 1 shows the basic structure of an optical head according to the invention. The optical head comprises a silicon substrate 101 on which photodetectors 102 and 103 are fabricated and further a semiconductor laser 104 of the Fabry-Perot type is mounted. On top of the silicon substrate, a prism/mirror substrate 107 with a cavity 106 having a reflecting mirror 105 is bonded. On top of the prism/mirror substrate, there is further bonded a lens substrate 109 with an objective lens 108 fabricated therein. The four sides of the individual substrates are aligned such that each side is substantially in the same plane. By "substantially in the same plane" herein is meant that the plane may include some surface irregularities that are produced in practice when such layered substrate wafers are diced in a manufacturing process, as will be described later.

Figure 2:
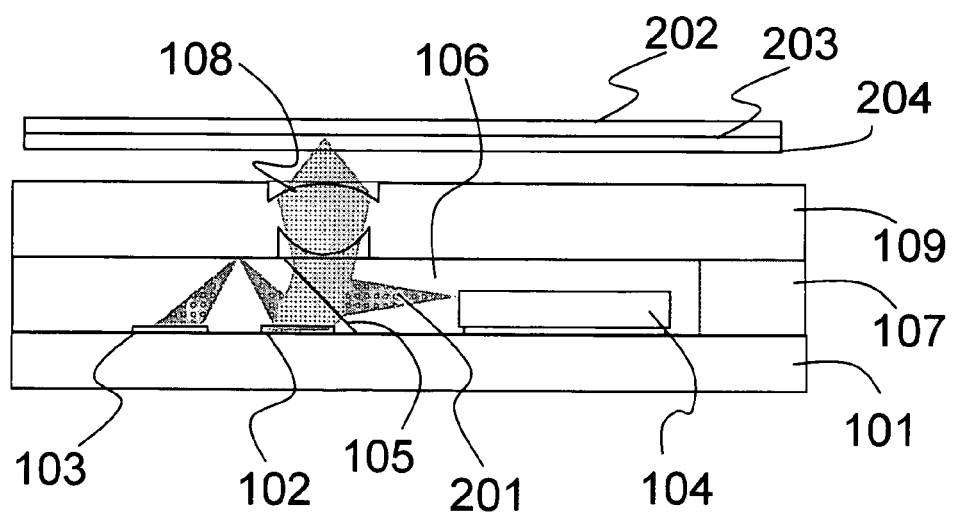
FIG. 2 shows a lateral cross section of FIG. 1.

FIG. 2 shows a lateral cross section of the optical head shown in FIG. 1, additionally showing a light flux 201 and an optical information storage medium 202. The light flux 201, which is emitted by the semiconductor laser 104, is reflected by the reflecting mirror 105 and is then focused on a recording film 203 on the optical information storage medium 202 through a cover layer 204. Reflected light is again incident on the objective lens 108 and then transmitted and refracted by the reflecting plane of the reflecting mirror 105. Some of the light is incident on the photodetector 102 as a detection signal, and the rest is further reflected at the plane of junction between the lens substrate 109 and the prism/mirror substrate 107 before it is received by the photodetector 103.

Figure 3:
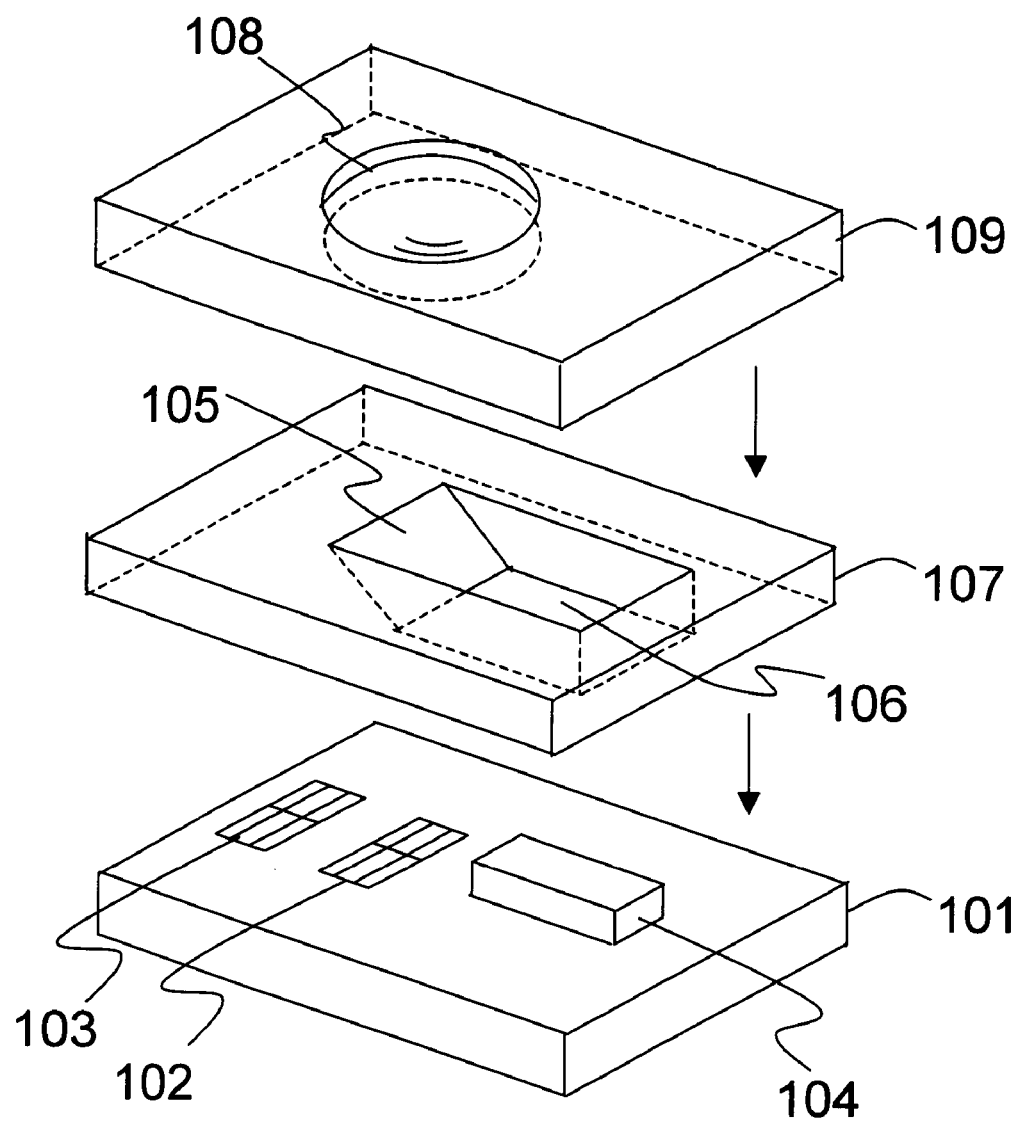
FIG. 3 shows an exploded view of the components of the optical head shown in FIGS. 1 and 2.

FIG. 3 shows an exploded view of the optical head shown in FIGS. 1 and 2. The semiconductor laser 104 is mounted on the silicon substrate 101, and the silicon substrate 101 and the prism/mirror substrate 107 are bonded to each other such that the semiconductor laser 104 is completely housed within the cavity 106 of the prism/mirror substrate 107. On top of this, the lens substrate 109 is bonded. When mounting the semiconductor laser 104, a transmitted image of an active laser stripe (not shown) of the semiconductor laser or an alignment mark (not shown) patterned on the surface of the semiconductor laser is aligned with an alignment mark (not shown) on the silicon substrate, before the semiconductor laser 104 is fixed in place using solder, which is patterned on the silicon substrate in advance.

By thus causing the light beam to be reflected by the top and bottom surfaces of the prism/mirror substrate at least once before the light beam is incident on the detectors, the magnification of the optical system can be increased while the thickness of the prism/mirror substrate is reduced. The "magnification of the optical system" herein refers to the ratio of the effective NA on the light source side to the NA on the image side. Particularly when an infinitive objective lens is combined with an infinitive collimator lens, the magnification would be equal to the ratio of the focal distance of the collimator lens to the focal distance of the objective lens. In other words, when the distance between the light source and the lens is increased so as to increase the RIM intensity with a narrow laser emission angle, the distance required for the refracted light beam within the prism to converge also increases. And the increase is accommodated by increasing the number of reflections using the prism/mirror substrate.

Figure 4:
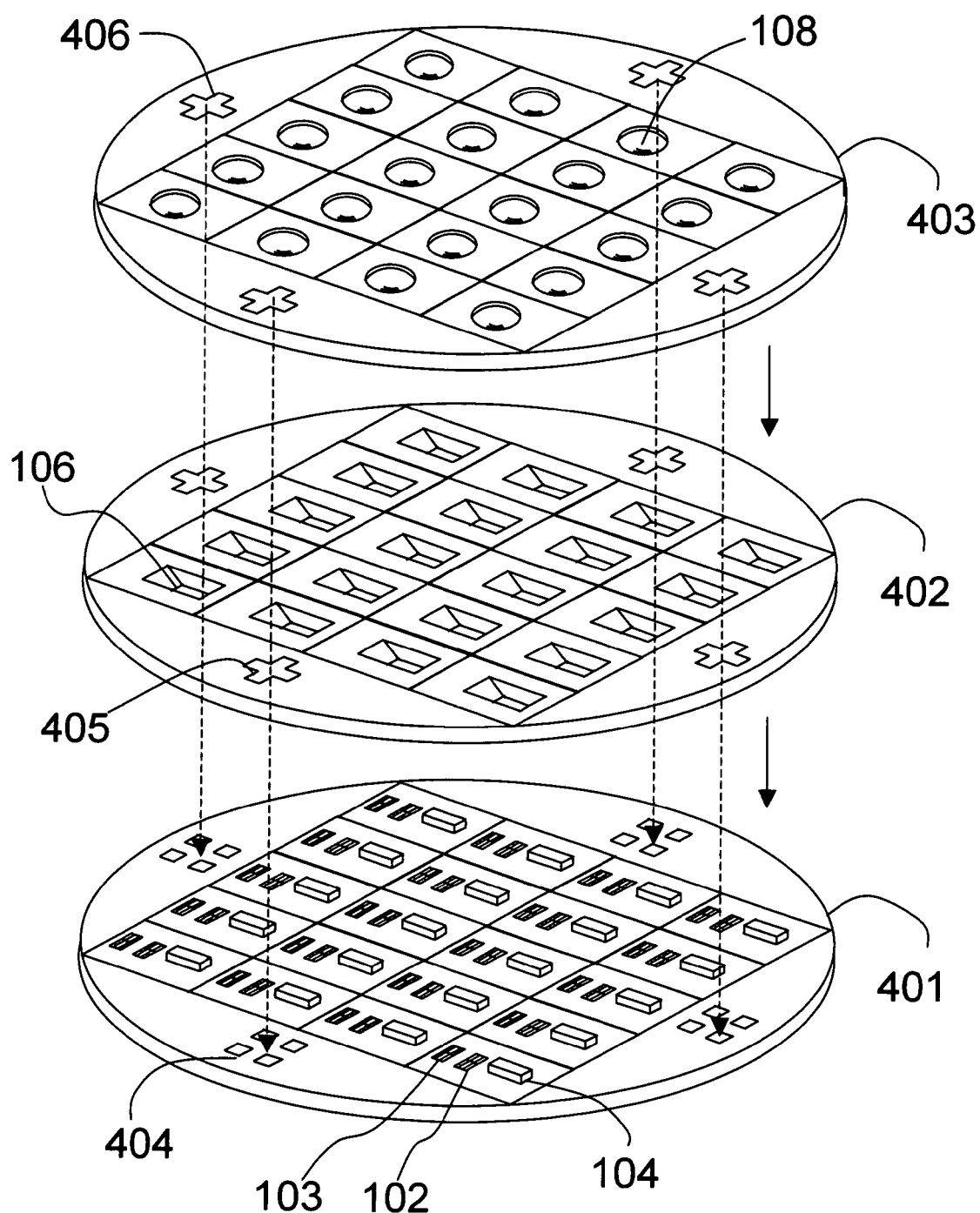
FIG. 4 shows a conceptual chart of a manufacturing process.

FIG. 4 shows the basic concept of an actual manufacturing process. On a silicon wafer 401, photodetectors 102 and 103 are prepared in an array, and semiconductor lasers 104 are mounted for individual photodetectors. The silicon substrate is provided with a plurality of alignment marks 404, with which alignment marks 405 on a prism/mirror substrate wafer 402 and alignment marks 406 on a prism/mirror substrate wafer 403 are aligned when the wafers are bonded together. When bonding the lens substrate wafer 403 and the prism/mirror substrate wafer 402, a UV resin may be placed between them and irradiated with UV light, for example. In this case, the amount of resin must be carefully measured so that the resin is evenly applied to each cell without overflowing into the cavity. For the bonding of the prism/mirror substrate 402 and the silicon wafer 401, methods other than the aforementioned method involving a UV-cured resin may be employed, such as anodic bonding.

Figure 5:
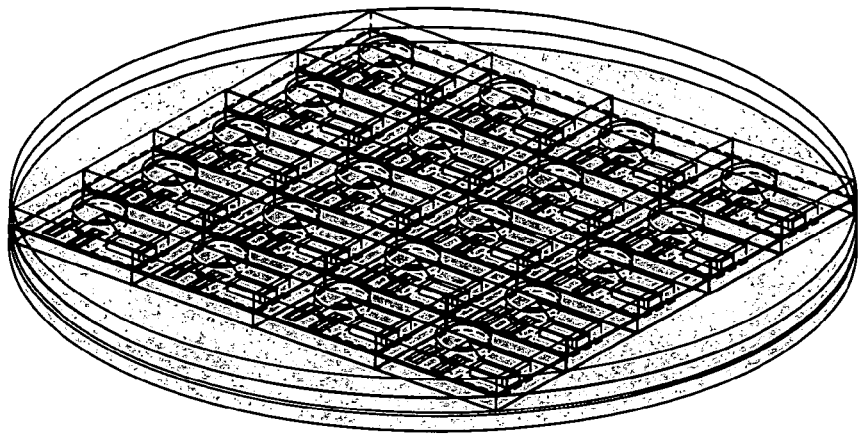
FIG. 5 shows individual wafers as joined together.
Figure 6:
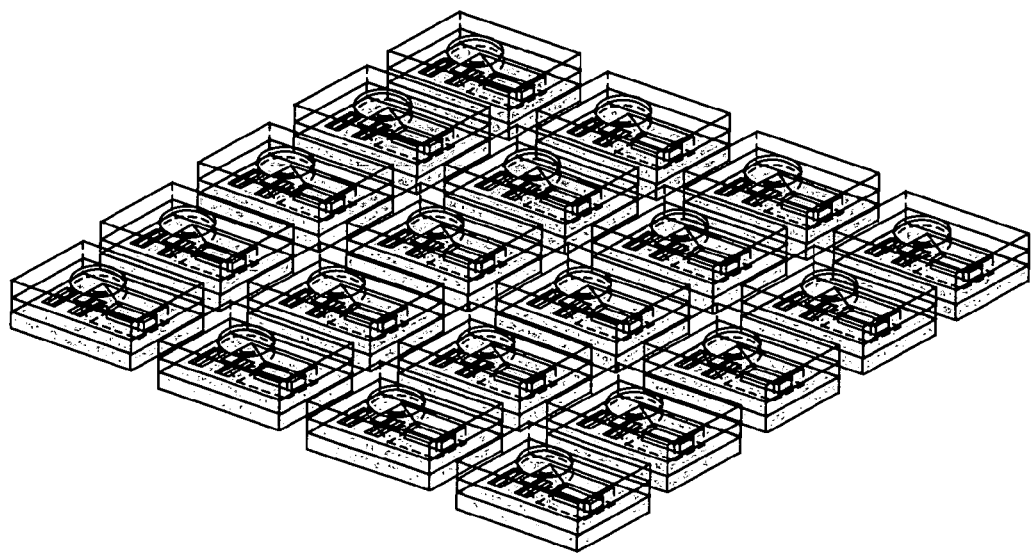
FIG. 6 shows a conceptual chart of how the joined wafers are cut so as to produce optical heads.

FIG. 5 shows the result of bonding the substrates of FIG. 4. FIG. 6 shows a schematic diagram of a number of optical heads prepared by cutting the bonded substrates. In FIG. 6, because the cutting is performed after the three substrates have been bonded together, each of the four sides of the optical head after cutting is substantially disposed in the same plane.

Figure 7:
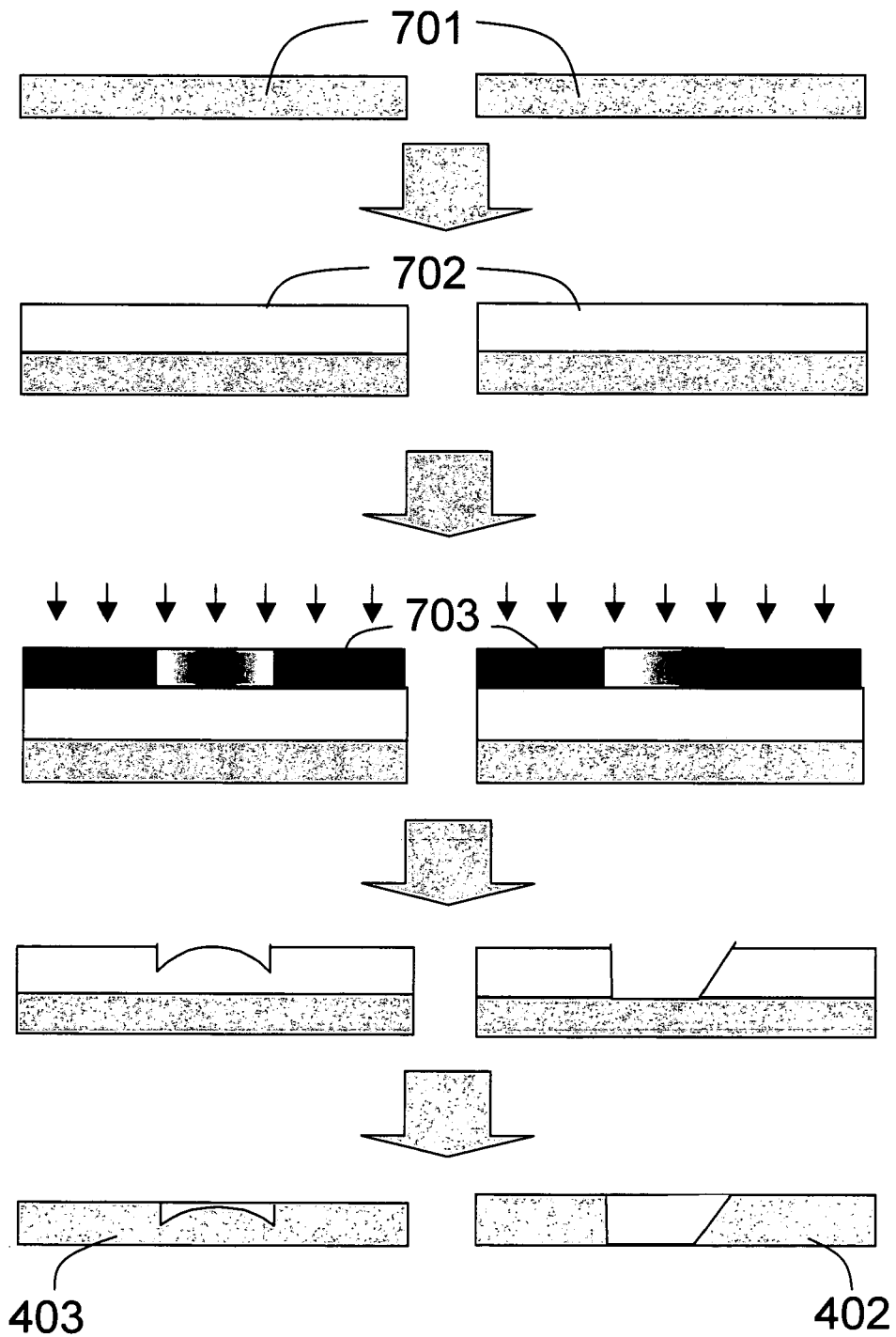
FIG. 7 shows a process of producing a lens substrate and a prism substrate.

FIG. 7 shows a process of manufacturing the lens wafer 403 and the prism/mirror substrate wafer 402. A glass substrate 701 is coated with a photoresist 702 and then exposed with a gray scale photomask 703, which has a light and shade pattern on it, placed closely on the substrate. When the exposed substrate is developed, a lens shape and a prism shape are formed on the resist. By dry-etching these shapes using $C_4F_8$ gas, for example, the shapes can be transferred onto the glass. Alternatively, for the prism substrate, for example, a mold may be prepared by machining and a pattern formed on it may be transferred to a glass or plastic substrate.

Thus, the prism/mirror substrate with cavities provided therethrough is bonded after the semiconductor lasers are mounted on the semiconductor substrate. As a result, heat can be readily dissipated from the semiconductor lasers through the semiconductor substrate, which has better heat conductance than glass or plastic. Further, mounting the semiconductor laser chips without there being any blocking parts in surrounding areas makes it easier to handle the semiconductor laser chips than if the semiconductor laser chips are placed in the cavities and then adjusted.

Because the semiconductor substrate, prism/mirror substrate, and lens substrate are bonded together before they are cut, the sides of the individual substrates can be each placed in the same plane. As a result, stress concentration does not easily occur and the resultant shape of the optical head facilitates its mounting on an actuator.

Furthermore, because the lens substrate is prepared by bonding an objective lens and a collimator lens together, the NA of the objective lens can be easily increased.

Embodiment 2

Figure 8:
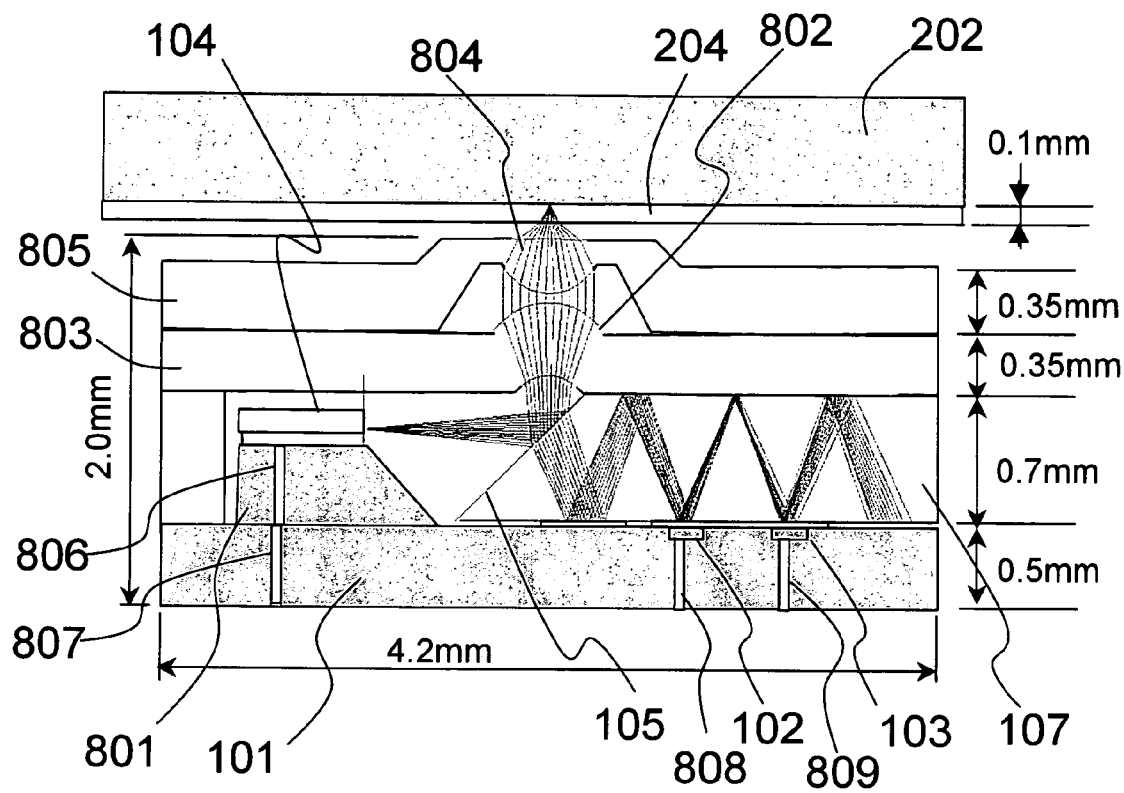
FIG. 8 shows a second embodiment of the optical head according to the invention.

FIG. 8 shows a second embodiment of the invention. Light emitted by a semiconductor laser 104 is reflected by a reflecting mirror 105 and then turned into parallel beams by a collimator lens 802. The beams are then focused by an infinity objective lens 804 on a recording film on an optical information storage medium 202 through a cover layer 204 with a thickness of 0.1 mm. The semiconductor laser 104 is mounted on a radiating stem 801 made of SiC. The collimator lens 802 is comprised of an aspherical surface formed on either side of a collimator lens substrate 803. In order to reduce the distance between the end of the semiconductor laser 104 and the collimator lens 802 as much as possible while maintaining a constant focal distance, the collimator lens 802 has a meniscus shape. The objective lens 804 is an aspherical lens formed on either side of the objective lens substrate 805 with an effective pupil diameter of 0.5 nun and NA of 0.85. The side of the objective lens 804 towards the recording medium is raised from the surrounding areas of the substrate by approximately 0.1 mm so as to reduce the possibility of collision with the cover layer 204. The reflected light is then again incident on the reflecting surface of the reflecting mirror 105 and then transmitted and refracted by the reflecting surface. The light is then reflected by the bottom and top surfaces of the prism/mirror substrate 107, and some of the light is then received by the photodetector 102. The rest is reflected by the photodetector 102 and again reflected by the top surface before it is received by the photodetector 103. Thus, the light emitted by the light source 104 is reflected a plurality of times between the plane of junction with the second substrate 101 and the plane of junction with the first substrate 803 before it is received by the detectors. Therefore, the magnification of the optical system can be increased while reducing the thickness of the prism/mirror substrate. Electric wires are connected to the semiconductor laser 104 and photodetectors 102 and 103 via throughholes 806, 807, 808, and 809 in the bottom surface of the silicon substrate 101. Electric inputs and outputs to the optical head are provided via flexible plastic cables (FPCs), which are not shown, through the bottom surface of the silicon substrate 101. The thickness of the optical head is 2 mm in total, and its length is 4.2 mm.

Figure 9:
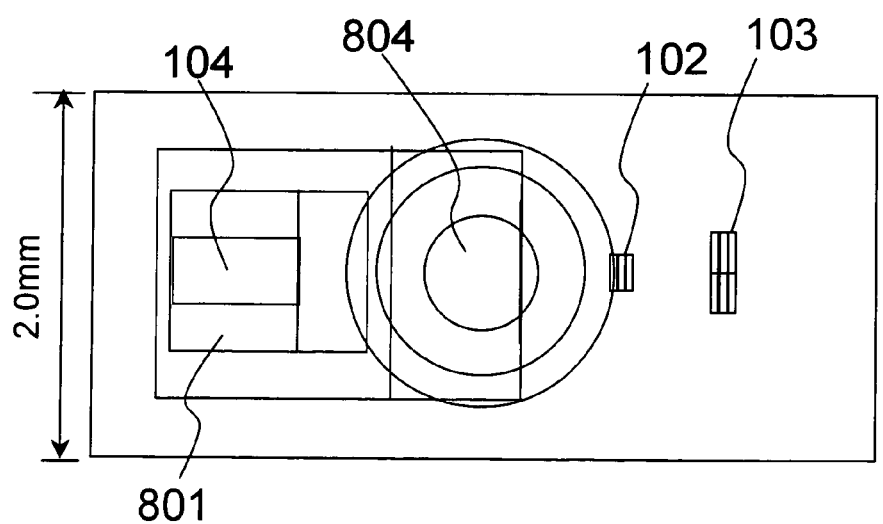
FIG. 9 shows a top view of FIG. 8.

FIG. 9 shows a top plan view of the optical head of FIG. 8. The optical head has a width of approximately 2 mm.

FIG. 10 shows a table of optical constants of the optical head shown in FIG. 8. "TYPE" indicates the type of plane, such as S for spherical or planar plane, A for an aspherical plane, SDM for a planar or spherical mirror with the center of plane displaced from optical axis, and SD for a planar or spherical plane with the center of plane displaced from the optical axis. "RADIUS" indicates the radius of curvature of the plane in millimeter units. "Infinity" indicates that the radius of curvature is infinite and therefore the plane is planar. "DISTANCE" indicates the distance from the plane that is located immediately behind in millimeter units; negative values show that the distance is that between the planes after an odd number of times of reflection. "STO" indicates that the plane has an aperture. Glasses are all M-LAF81, the wavelength is 405 nm, and "INDEX" indicates the refraction index under these conditions. The refraction index values assume negative values after an odd number of times of refractions. "APE-Y" indicates the radius of each plane shown in a light-beam tracing chart, which is indicated in millimeter units. Because the radius of aperture in the STO plane is 0.25 mm, it is seen that the effective pupil diameter of the objective lens is 0.5 mm. "AP" indicates the shape of the aperture in each plane, such as C for circular and R for rectangular. "ADE" indicates the inclination of the plane. It is indicated that the seventh plane is the recording film of the information storage medium and that the same planes as those of the incoming path are tracked in the opposite direction until the 13$^{th}$ plane. The 14$^{th}$ plane and subsequent planes are the reflecting planes within the prism.

FIG. 11 shows the aspherical coefficients of the aspherical planes of FIG. 10. The second and third planes of FIG. 10, which are the both sides of the collimator lens 802, are each indicated to be an aspherical plane given by the aspherical coefficients shown in the table. The 4$^{th}$ plane (aperture plane) and the 5$^{th}$ plane are the both sides of the objective lens 805. The aspherical equation is given by:

$$z(r) = \frac{r^2}{R + \sqrt{R^2 - (k+1)r^2}} + Ar^4 + Br^6 + Cr^8 + Dr^{10} \quad (1)$$

Figure 12:
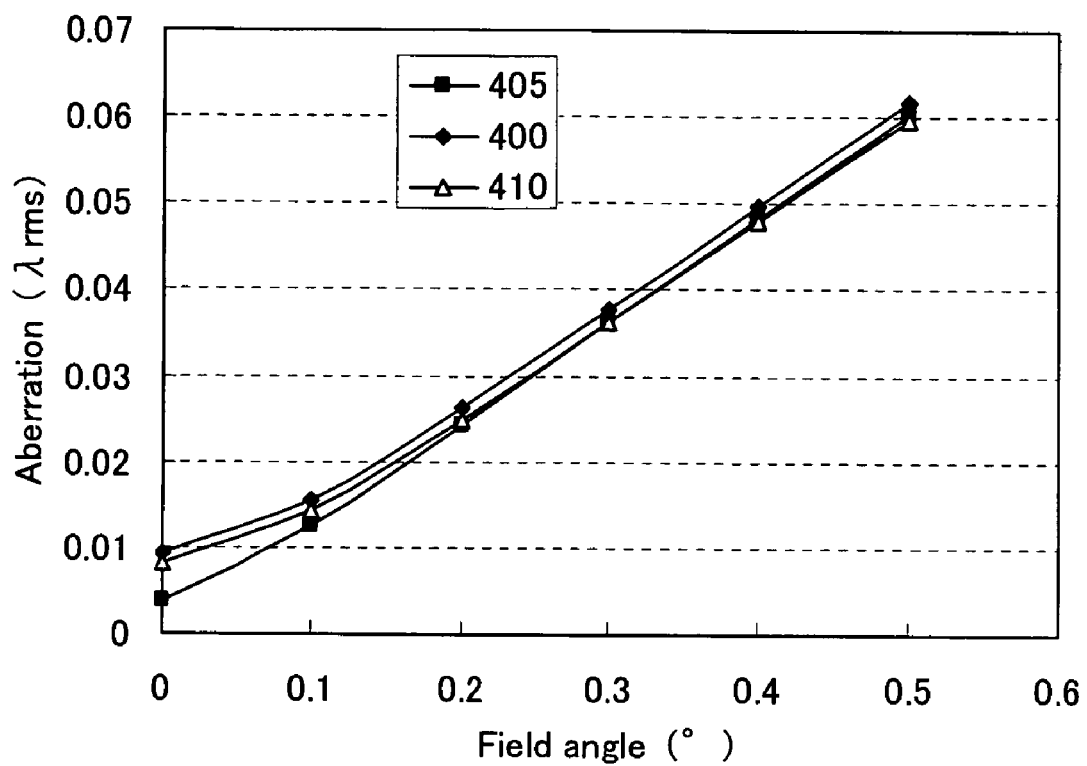
FIG. 12 shows spot aberration characteristics on the disc surface in the optical system shown in FIG. 8.

FIG. 12 shows the field-angle characteristics of wave aberration of optical spot on the recording film shown in FIG. 8. The characteristics are plotted while varying the wavelength by ±5 nm from 405 nm, each plot representing the wave aberration at the best focus. The result shows that generally favorable focusing characteristics are obtained.

Figure 13:
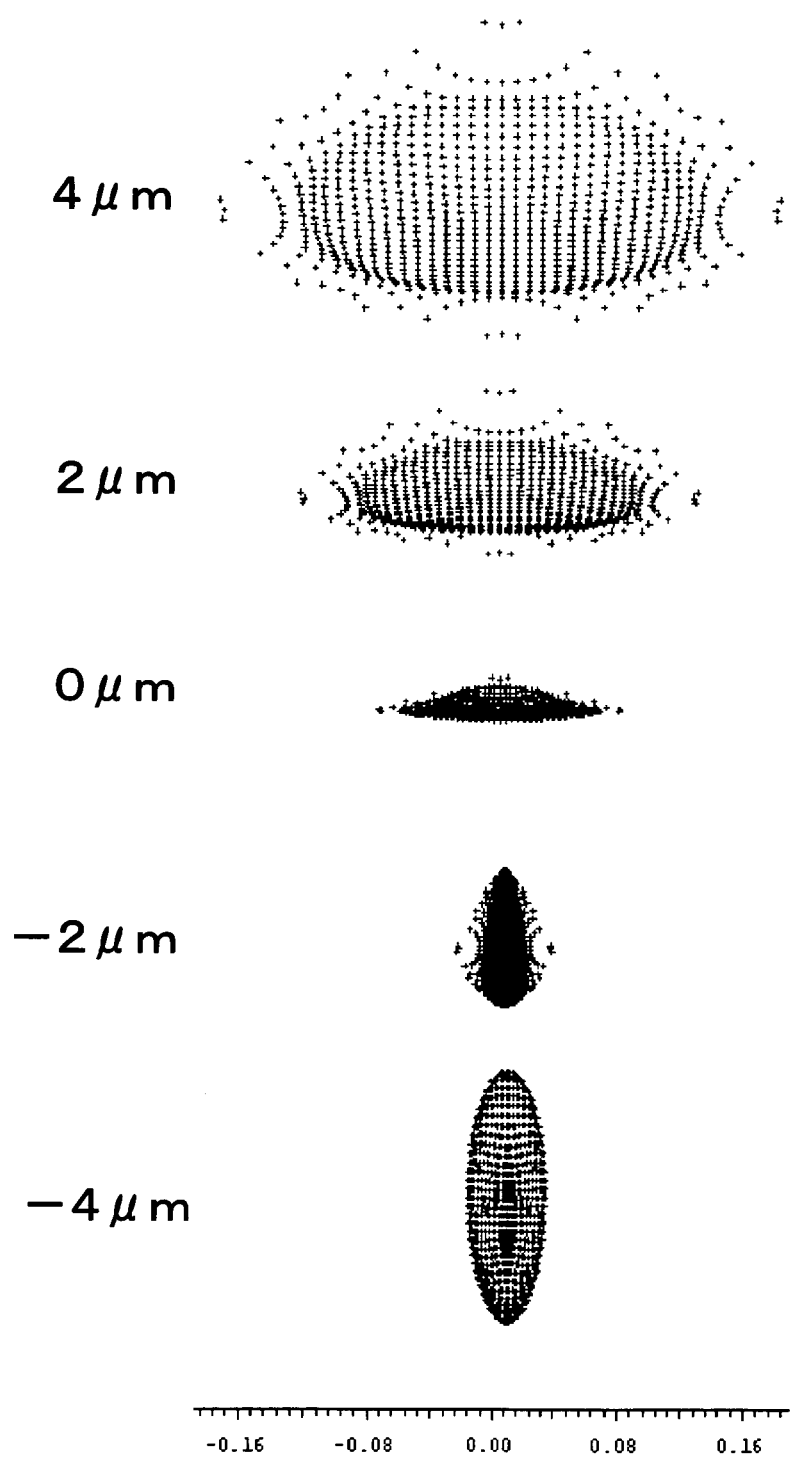
FIG. 13 shows the on-disc defocus dependency of an optical spot between detectors.

FIG. 13 shows the spot distribution on the upper plane of the prism/mirror substrate between the photodetectors 102 and 103 that was obtained while varying the amount of defocus on the disc, namely, the distance between the objective lens 804 and the cover layer 204. It can be seen that astigmatism is produced on the detectors. This is due to the fact that the convergent light is incident on an inclined refractive plane, which cannot be avoided in the optical system of FIG. 8. The astigmatism, however, does not have any influence on the optical spot on the disc surface and does not pose any problems as long as focal point detection and tracking detection can be carried out.

Figure 14:
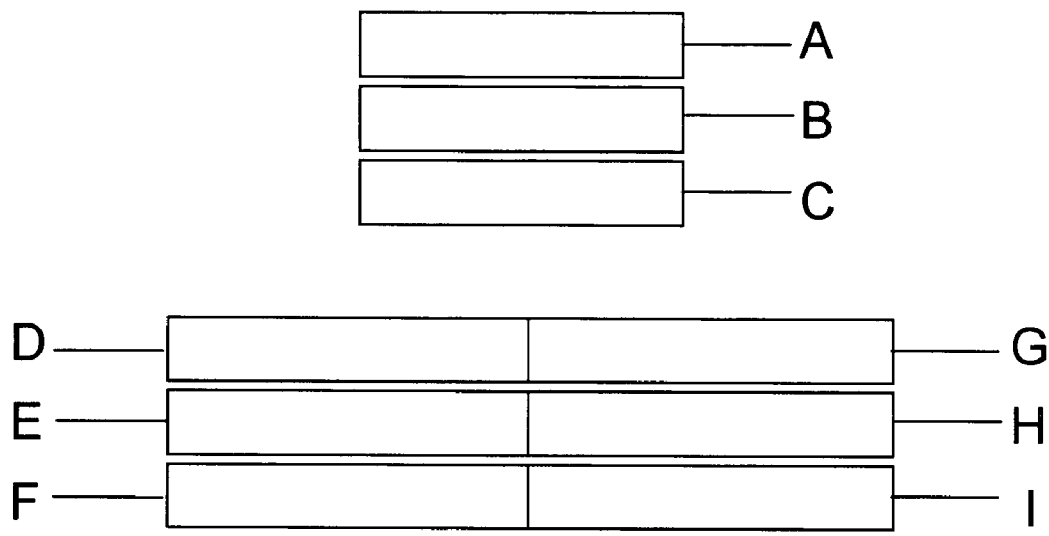
FIG. 14 shows detector patterns and signal computation formulae.

FIG. 14 shows detector patterns for detecting a focal error signal and a tracking error signal from a spot with astigmatism, as in the case of the optical spot shown in FIG. 13. The figure also shows signal computation formulae. A band-shaped photodetector consisting of three sections and another consisting of six sections are disposed in front of and behind, respectively, the focal point. Individual output signals are calculated in accordance with the computation formulae shown so as to obtain an FES (focus error signal), a TES (tracking error signal), and an RFS (radio frequency signal). k is a computational gain for the correction of imbalance in the total amount of light in front of and behind the focal point.

Figure 15:
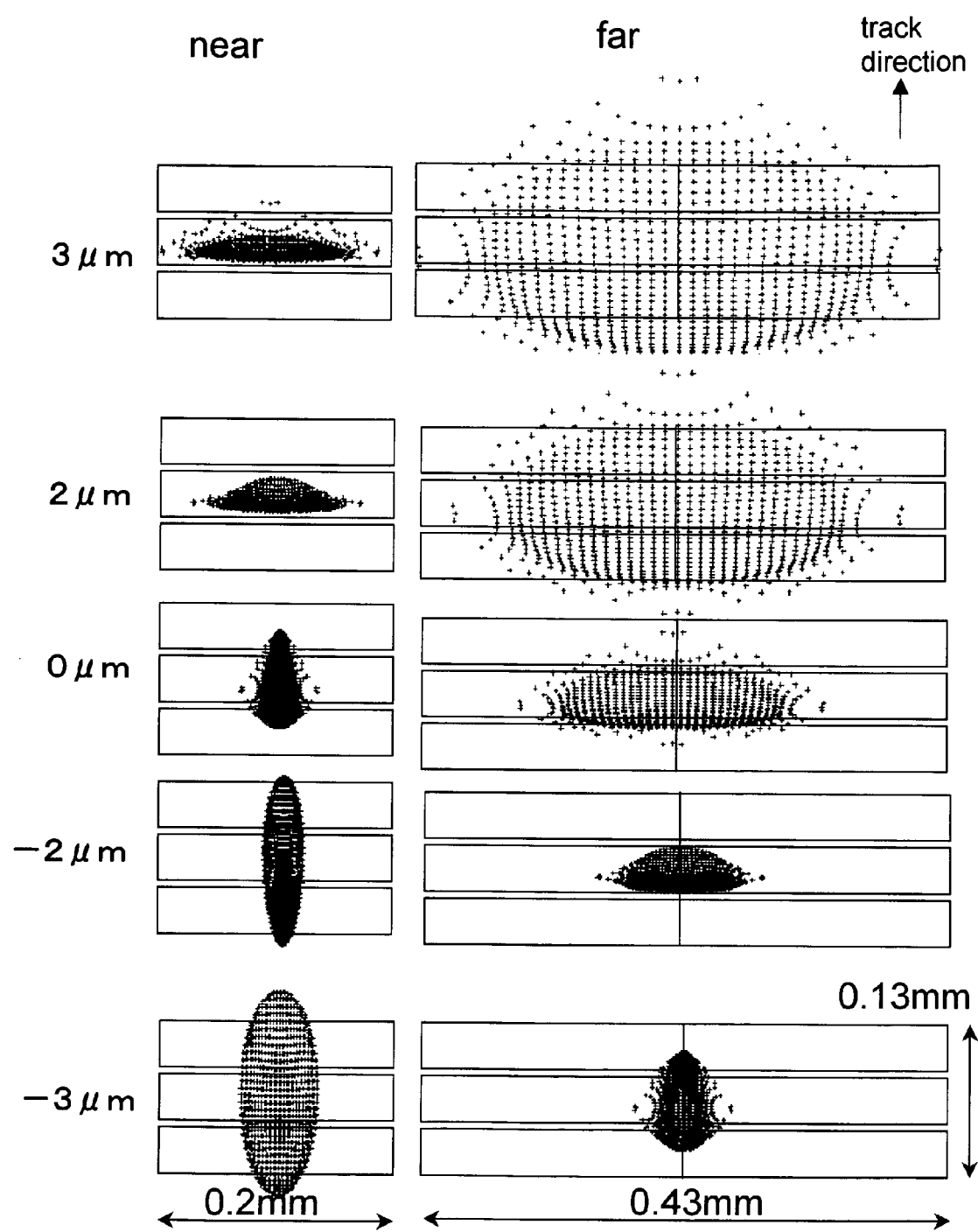
FIG. 15 shows the on-disc defocus dependency of an optical spot distribution on a detector.

FIG. 15 shows the results of computing the distribution of light incident on the photodetectors shown in FIG. 14 while varying the amount of defocus on the information storage medium. The numbers on the left of the drawing indicate the amount of defocus. It can be seen from these results that the focus error signal can be obtained by the calculation formulae of FIG. 14. It can also be seen that the imbalance in intensity in the direction perpendicular to the tracks of the recording medium can be detected by the photodetector located on the further side, and that the tracking signal based on the push-pull system can also be calculated using the calculation formulae of FIG. 14.

Figure 16:
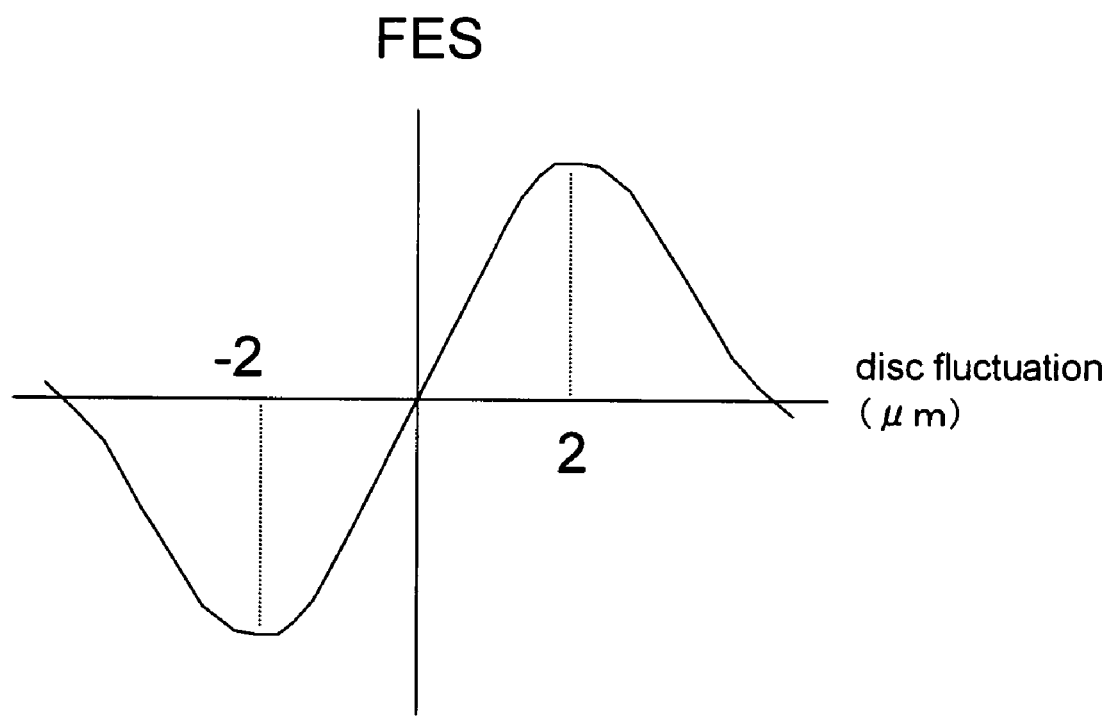
FIG. 16 shows a focus error signal.

FIG. 16 schematically shows a resultant focus error signal. It can be seen that there is a range of approximately ±2 μm for focus error detection.

Embodiment 3

Figure 17:
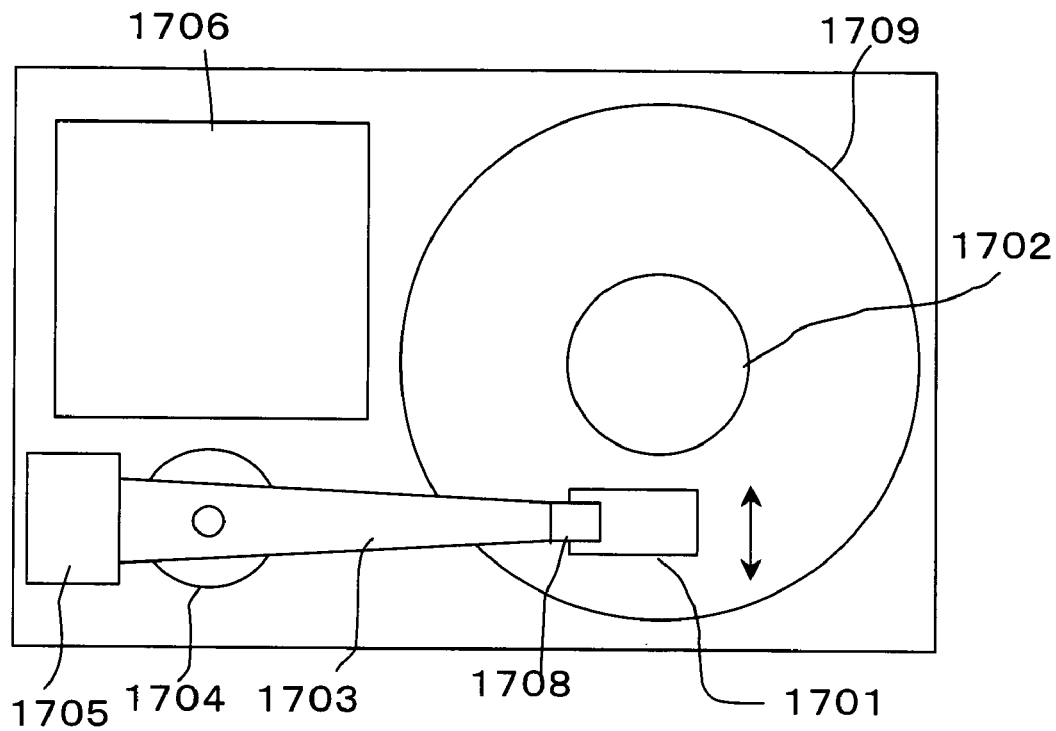
FIGS. 17A and 17B show an embodiment of a ultra-small optical disc unit employing an optical head of the invention.
Figure 17:
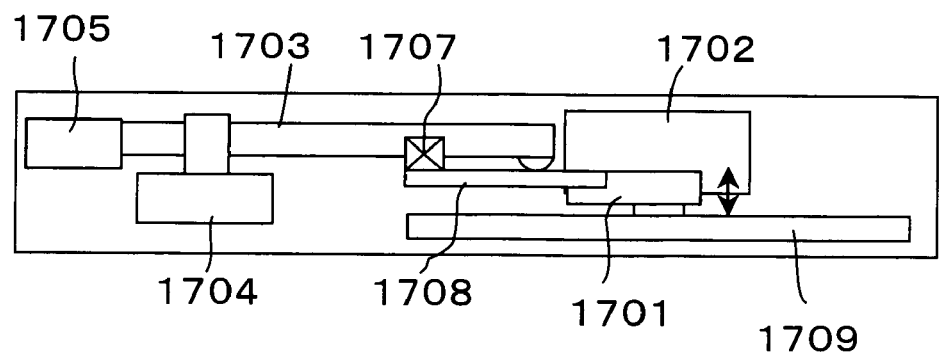

FIGS. 17A and 17B show an embodiment of a small-sized optical disc unit utilizing a ultra-small optical head 1701 according to the invention. FIG. 17A is a plan view, and FIG. 17B is a side view. The small optical head 1701 is mounted on an actuator arm 1708, which can be moved finely by a focus actuator 1707 in the direction of the optical axis of the objective lens in the optical head. The actuator arm 1708 and the focus actuator 1707 are fixed to a swing arm 1703, together with a counter balance 1705. The swing arm 1703 is driven by a swing motor 1704 so as to move the small optical head 1701 in the radius direction of an optical disc 1709. The optical disc 1709 is rotated by a spindle motor 1702. Input and output of signal to the optical head are enabled by flexible plastic cables (not shown) connected to a control circuit 1706.

When the thus prepared optical head is mounted and driven on an actuator, a large amount of disc eccentricity can be dealt with even when the effective pupil diameter of the lens is reduced. In conventional optical discs, the disc eccentricity is handled through the actuation of only the lens mounted on the actuator. In this case, however, the axis of the lens with respect to the fixed optical system moves. As a result, when the push-pull method is employed where the tracking signal is detected on the basis of the distribution of the reflected light, an offset is produced by the shifting of the lens, whose influence becomes greater as the diameter of the effective light flux becomes smaller. To avoid this, a differential push-pull method is employed in DVDs, for example, whereby three beams of light are collected on the disc, and the offset is canceled by a differential computation of push-pull signals from sub-spots on either side and a push-pull signal from the main spot. However, the optical system in which three spots are collected requires a diffraction grating or the like. Such system also has disadvantages such as a reduction in the efficiency of optical utilization of the main spot due to the presence of the sub-spots, or the generation of unwanted stray light. In accordance with the above-described embodiment of the invention, however, the optical head can be easily reduced in size and integrated, so that the optical head can be driven integrally and therefore the generation of offset can be prevented.

Embodiment 4

Figure 18:
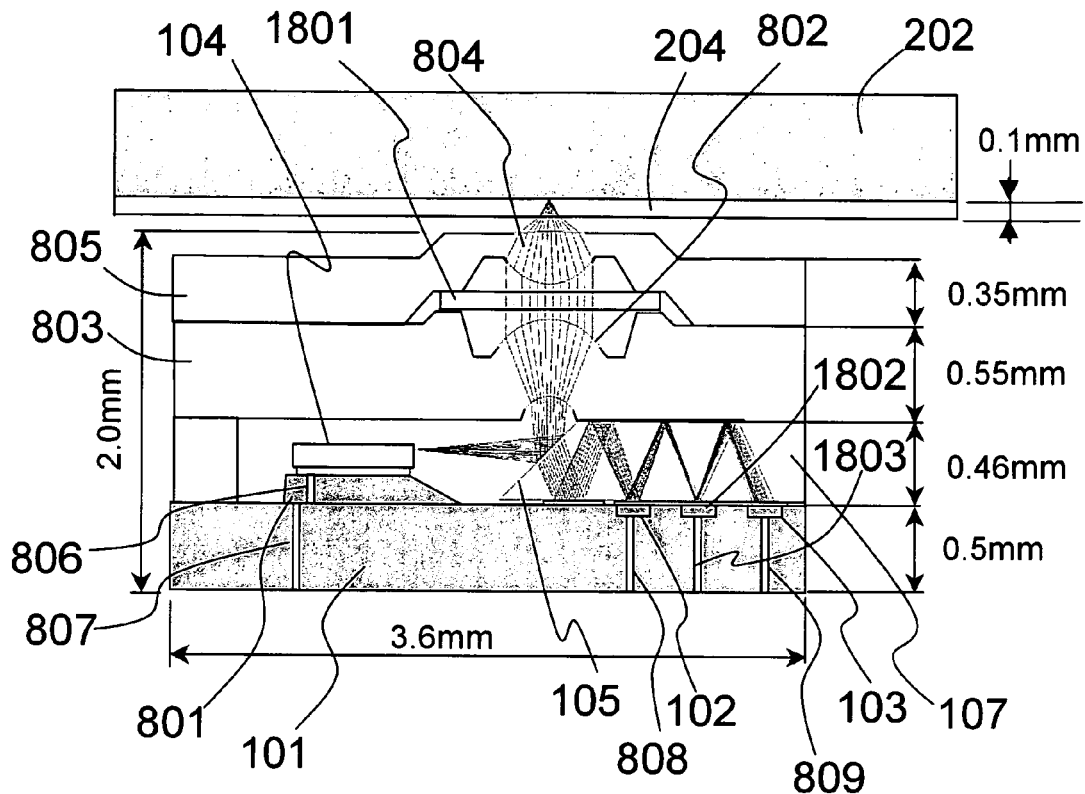
FIG. 18 shows an optical head according to another embodiment of the invention.

FIG. 18 shows another embodiment of the invention, in which a quarter-wave plate 1801 with a thickness of approximately 0.1 mm is inserted between an objective lens 804 and a collimator lens 802. A plane is formed in the peripheral areas of each lens that is flat and protruding from the lens planes, and the quarter-wave plate 1801 is sandwiched between these planes. In this way, the quarter-wave plate 1801 can be fixed between the objective lens substrate 805 and the collimator lens substrate 803, using an adhesive agent (not shown) or the like, without the plate coming into contact with the lens faces. The crystal axis direction of the quarter-wave plate 1801 is adjusted such that the transmitted light of the linearly polarized light incident on the quarter-wave plate 1801 becomes circularly polarized light. When the reflected light from the recording film 203 passes through the objective lens 804 again and further passes through the quarter-wave plate 1801 again, the light is converted into linearly polarized light with the direction of polarization rotated by 90° with respect to the polarization of the light that was initially incident on the quarter-wave plate 1801. When the surface of the reflecting mirror 105 is coated with a multilayered film (not shown) by vapor deposition, for example, such that the s-polarized light is reflected and the p-polarized light is transmitted by the reflecting mirror, the reflected light from the disc can be again reflected by the reflecting mirror and prevented from returning to the semiconductor laser 104. In this way, noise components in the intensity of laser oscillation induced by the returning light to the semiconductor laser 104 can be reduced. In the present embodiment, the thickness of the optical head as a whole would have to increase in principle due to the addition of the quarter-wave plate, as compared with the embodiment of FIG. 8. However, the thickness is controlled to be the same as that of FIG. 8 through a review of the design of the collimator lens 802 and an enhancement of the beam enlarging effect. Further, in the present embodiment, the position within the prism/mirror substrate 107 where the light is most focused in the plane of the drawing sheet is the fifth point of reflection, and the photodetectors 102 and 103 for the detection of focal point error are disposed at the third and seventh points of reflection, respectively. At the fifth point of reflection, there is also newly disposed a photodetector 1802, the output of which is used as a reproduction signal. Thus, the need to use a separate-type photodetector for detecting a reproduction signal is eliminated, thereby improving the signal-to-noise ratio of the RF signal.

Figure 19:
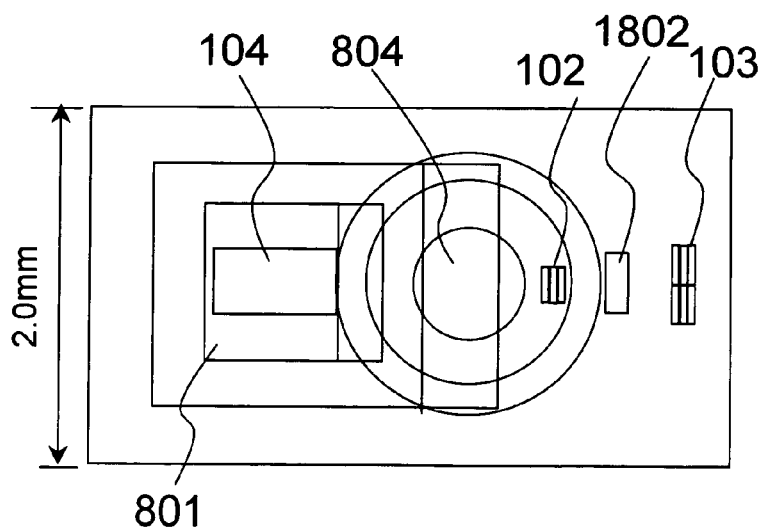
FIG. 19 shows a top view of the embodiment shown in FIG. 18.

FIG. 19 shows a top plan view of the optical head of FIG. 18.

Figure 20:
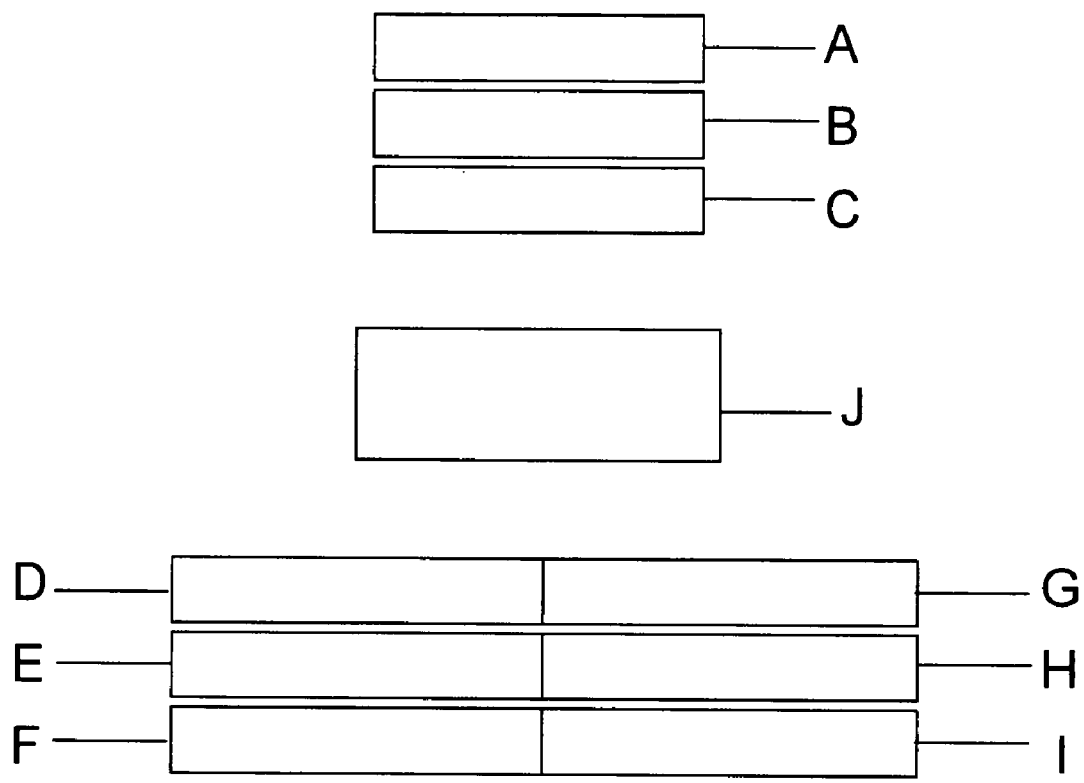
FIG. 20 shows detector patterns and signal computation formulae for the embodiment shown in FIG. 18.

FIG. 20 shows the arrangement of photodetectors for signal detection and formulae for signal calculation in the present embodiment. As mentioned above, by using the output signal from the photo-detecting region at the center as the RF signal, the S/N ratio of the reproduction signal can be improved. Generally, signals from separate light-receiving portions are once subjected to current-to-voltage conversion and amplification in an amplifier, before they are subtracted or summed. In this process, amplification noise is added from the amplifier into the calculated signal, the amount of such noise corresponding to the number of contributing amplifiers. This is why it is desirable to detect the RF signal, whose S/N ratio is particularly necessary to be improved, using a single light-receiving portion and perform current-to-voltage conversion and amplification in a single amplifier.

In accordance with the invention, the optical head in an optical information reproduction apparatus can be minimized to a very high degree, adjusted easily, and manufactured at low cost. The invention allows the optical disc units with large capacities to be greatly reduced in size such that they can be mounted on cellular phones, for example. As a result, a greater variety of applications can be utilized on cellular phones. Furthermore, by utilizing the technology of the invention on video cameras, it becomes possible to realize video cameras with sizes comparable to those of digital cameras. When a plurality of such ultra-small optical heads are mounted on a single optical disc unit so as to allow information to be recorded or reproduced in parallel, the transfer rate can be effectively enhanced.

What is claimed is:

1. An optical head comprising:
   a first substrate including a lens for focusing light on an information storage medium;
   a second substrate including a detector on the surface thereof; and
   a layer disposed between said first substrate and said second substrate and including a prism and a mirror,
   wherein said layer comprises a cavity in which a light source is disposed, said light source emitting light that is reflected by said mirror, passes through said lens, and is then focused on said information storage medium, wherein the light reflected by said information storage medium passes through said lens and said prism and is then detected by said detector.

2. The optical head according to claim 1, wherein said lens has an effective pupil diameter of not more than 0.5 mm, and wherein said information storage medium has a cover layer with a thickness of not more than 0.1 mm.

3. The optical head according to claim 1, wherein each of the adjoining sides of said first substrate, said layer, and said second substrate is substantially in the same plane.

4. The optical head according to claim 1, wherein said lens is composed of two lenses joined together.

5. The optical head according to claim 1, wherein said first substrate is composed of a substrate in which a collimator lens is formed, and a substrate in which an objective lens is formed joined together.

6. The optical head according to claim 1, wherein said first substrate is composed of a substrate in which a collimator lens is formed, a quarter-wave plate, and a substrate in which an objective lens is formed joined together.

7. The optical head according to claim 1, wherein the light emitted by said light source is reflected by said information storage medium and is then incident on said prism, the light further being reflected once or more each at the plane of junction with said second substrate and at the plane of junction with said first substrate within said prism, before the light is incident on said detector.

8. The optical head according to claim 7, wherein the light emitted by said light source is reflected a plurality of times at the plane of junction with said second substrate and at the plane of junction with said first substrate within said prism, before the light is incident on said detector.

9. The optical head according to claim 1, wherein the region of said first substrate in which said lens is formed is raised from the other regions of said first substrate.

10. An optical reproduction apparatus comprising an optical head comprising:
   a first substrate including a lens for focusing light on an information storage medium;
   a second substrate including a detector on the surface thereof; and
   a layer disposed between said first substrate and said second substrate and including a prism and a mirror,
   wherein said layer comprises a cavity in which a light source is disposed, said light source emitting light that is reflected by said mirror, passes through said lens, and is then focused on said information storage medium,
   wherein the light reflected by said information storage medium passes through said lens and said prism and is then detected by said detector,
   said optical reproduction apparatus further comprising:
   an actuator on which said optical head is mounted; and
   means for driving said actuator.

* * * * *